United States Patent [19]

Ranoia

[11] Patent Number: 5,029,771
[45] Date of Patent: Jul. 9, 1991

[54] SPINNER TOOL FOR CARTRIDGE REEL

[76] Inventor: Vincent J. Ranoia, 5000 Fairway Rd., Drexel Hill, Pa. 19026

[21] Appl. No.: 385,493

[22] Filed: Jul. 26, 1989

[51] Int. Cl.⁵ .................. G03B 1/04; G11B 15/32; B25B 13/48
[52] U.S. Cl. ..................... 242/197; 81/176.150; 81/488; 242/179
[58] Field of Search ............ 242/197, 179, 96; 81/488, 176.1, 176.15

[56] References Cited

U.S. PATENT DOCUMENTS

| | | | |
|---|---|---|---|
| 3,564,949 | 2/1971 | Hedrick | 81/176.15 |
| 3,999,725 | 12/1976 | Arbib | 242/179 X |
| 4,147,314 | 4/1979 | Traulsen | 242/179 |
| 4,408,732 | 10/1983 | Toriumi et al. | 242/192 |
| 4,703,903 | 11/1987 | Gilmore | 242/179 |

*Primary Examiner*—Daniel P. Stodola
*Assistant Examiner*—William G. Battista, Jr.
*Attorney, Agent, or Firm*—Eugene E. Renz, Jr.

[57] ABSTRACT

A spinner tool device for use with a cartridge reel having a reel hub with openings for engagement with a motor drive, comprising a spinner body having a front face sized to access said reel hub, at least one projection pin on said face for engagement with said reel hub, an annular rim on said body sized to align said pin with said hub to permit rotational engagement, and handle means for gripping said body and rotating said hub.

1 Claim, 2 Drawing Sheets

SPINNER TOOL FOR CARTRIDGE REEL

FIELD OF THE INVENTION

The present invention relates to a spinner tool device for use with cartridge reels which contain film such as movie films, microfilms, and the like. The cartridge reels are designed to operate with a motor drive in association with viewing or projecting equipment.

BACKGROUND OF THE INVENTION

At the present time, a great deal of information is stored in cartridge reels which contain film, such as microfilm. For example, in the United States Patent Office Search Room, microfilm cartridges are available which have every United State patent in chronological order. These cartridges are selected and inserted into a motor driven spinner. The cartridge reel contains a reel hub which has openings for engagement with the motor drive of the microfilm viewing film. Typically, the reel hub has a face with four holes which are sized to be engaged by pins on the drive mechanism of the viewing equipment.

Typically, the cartridge reel contains a square box with alignment guides for inserting the cartridge into the viewing equipment. A round aluminum hub is attached to a molded plastic reel. The reel is slightly smaller than the inside wall of the cartridge and is loosely contained in the cartridge box. The entire cartridge is designed to fit into a motor driven spinner where the four projecting pins engage the reel and wind or unwind the film contained on the reel.

While the cartridge reel system is highly effective for storing film of various types, and while the motor driven viewing devices provide for access to the film at varying speeds, it is not always possible to use a motor driven spinner, either because the viewing device is in use or because it is at a different location. Anyone who has attempted to turn the wheel in a cartridge of this type by hand has experienced a great deal of frustration. Occasionally, the film is partially removed from the reel, for repair or for specific viewing of a particular frame or for other reasons. Attempting to rewind the film by hand is inefficient at best. Efforts to rewind a cartridge reel using a pencil, for example, to turn the reel, can cause the film to be jammed inside the cartridge box since the reel is not supported in a location equally distant from the four inside walls. Even if the film is not damaged, it can be bound up or stuck so that the cartridge has to be disassembled.

It would be a great advantage if a small hand held spinning device could be provided which would allow the reel with the film to be turned in either direction with relative ease as is done with a motor driven spinner. It would also be a great advantage if the device used to manually turn the reel in a cartridge reel assembly was self aligning without requiring the cartridge to be placed in a supporting or aligning device. Other objects will appear hereinafter.

SUMMARY OF THE INVENTION

It has now been discovered that the above and other objects of the present invention can be accomplished in the following manner. Specifically, a new spinner tool device has been discovered which is admirably suited for use with a cartridge reel where the cartridge reel has a reel hub with openings for engagement with a motor drive.

The spinner tool device includes a spinner body having a front circular face sized to access said reel hub and includes at least one projecting pin on said face for engagement with the reel hub. An annular rim is located on said body and is sized to align the pin with the hub to permit rotation engagement. Finally, a handle is provided for gripping the body and rotating the hub when the face is engaged with the hub to thereby turn the reel hub inside the cartridge.

In a preferred embodiment, the handle further includes an axially centered cylindrical handle having a grip increasing surface on at least a portion of the handle. Preferably the body will futher include a rear face from which the handle means extends. The rear face can, optionally, be provided with at least one axially offset torque pin extending generally parallel to the handle means. The rear face may also be circular in shape.

In the most preferred embodiment, the annular rim is sized to fit inside the opening of the cartridge, which opening is larger than the diameter of the hub. The rear face, which also can be an annular ring or disk, is larger than the annular rim, and also is larger than the opening in the cartridge box. With the construction, the spinner body is self-aligning and maintains the reel hub in a position centered about the axis of the cartridge box.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
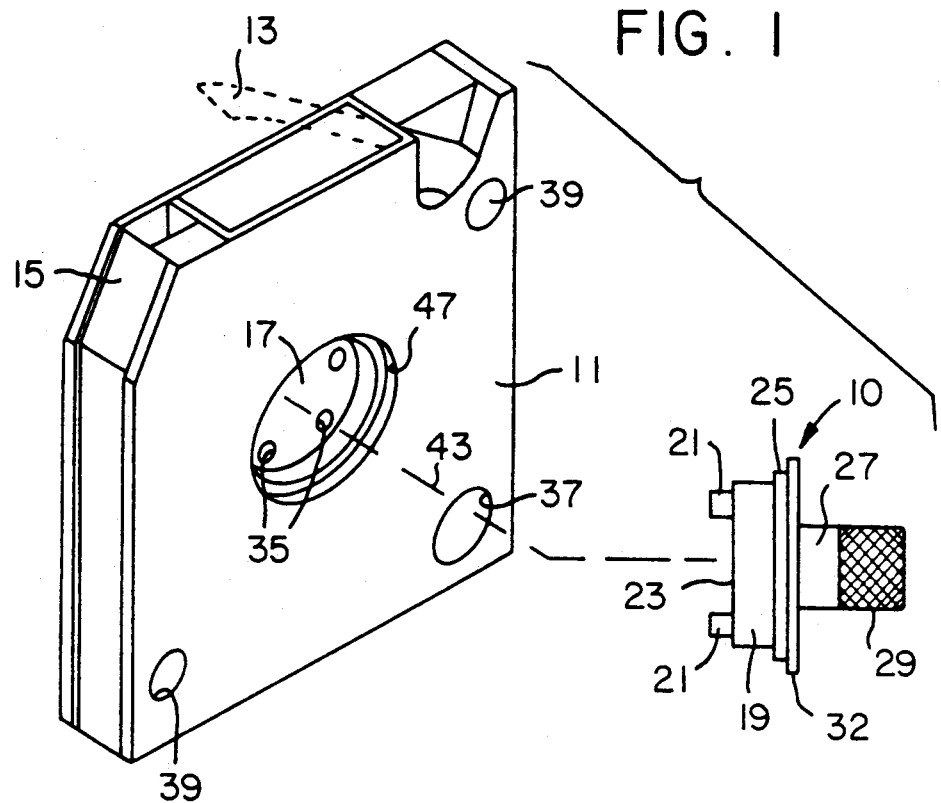
FIG. 1 is a combined perspective view of a conventional film cartridge and an associated, disengageable manual film actuator, shown in a side elevational view, disengaged with the film cartridge spool all in accordance with the following invention.

The assembly, shown generally by the reference numeral 10, includes a cassette or cartridge box 11 which is designed to accommodate film 13 as previously described. The film 13 may be microfilm, movie film, or other types of film. The cartridge box 11 typically will include an angled corner which is used for alignment with a motor driven spinner device for viewing the film or providing other access to the film. The cassette 11 is inserted into a motor driven spinner and viewing device so that the center portion or reel hub 17 engages four projections from the motor drive to cause the hub to rotate and move the film 13 into or out of the cartridge box 11.

Also shown in FIG. 1 is the spinner tool device of the present invention. The spinner tool device includes a spinner body 19 provided to position projection pins 21 which extend from face 23 of the body 19. While two projection pins 21 are shown in the present embodiment, it has been found that the device is equally effective with one or four projecting pins which engage the reel hub 17. The body 19 also contains an annular rim 25 which is sized to align the pin or pins 21 with the hub 17 to permit rotational engagement. Extending from the body 19 in the other direction is a handle 27 which includes a gnarled grip portion 29. Turning the handle 27 causes the body 19 to rotate about the axis, whereby pins 21 turn hub 17 as more fully described herein below.

Figure 5:
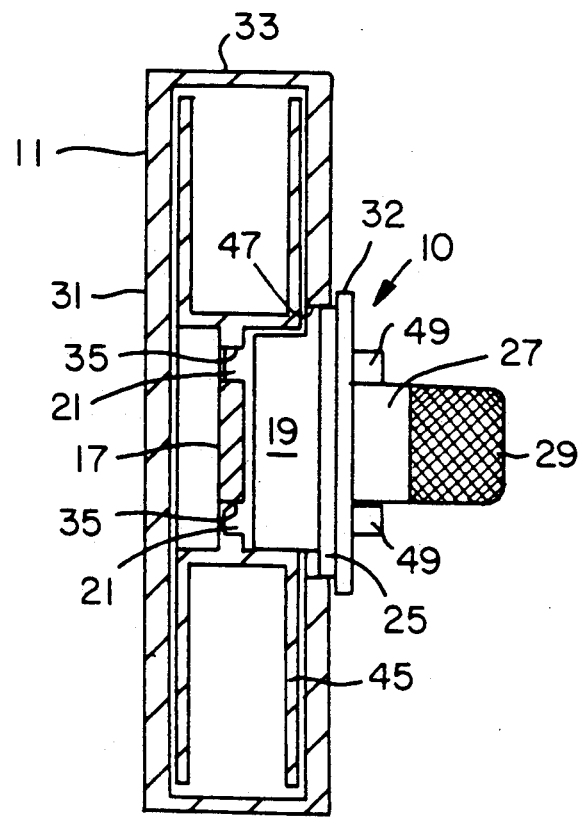
FIG. 5 is a transverse sectional elevational view on the line 5,5 of FIG. 2 showing additional details of construction of the film cartridge and the interengagement of the manual winding and positioning actuator of this invention, with the film spool.
Figure 2:
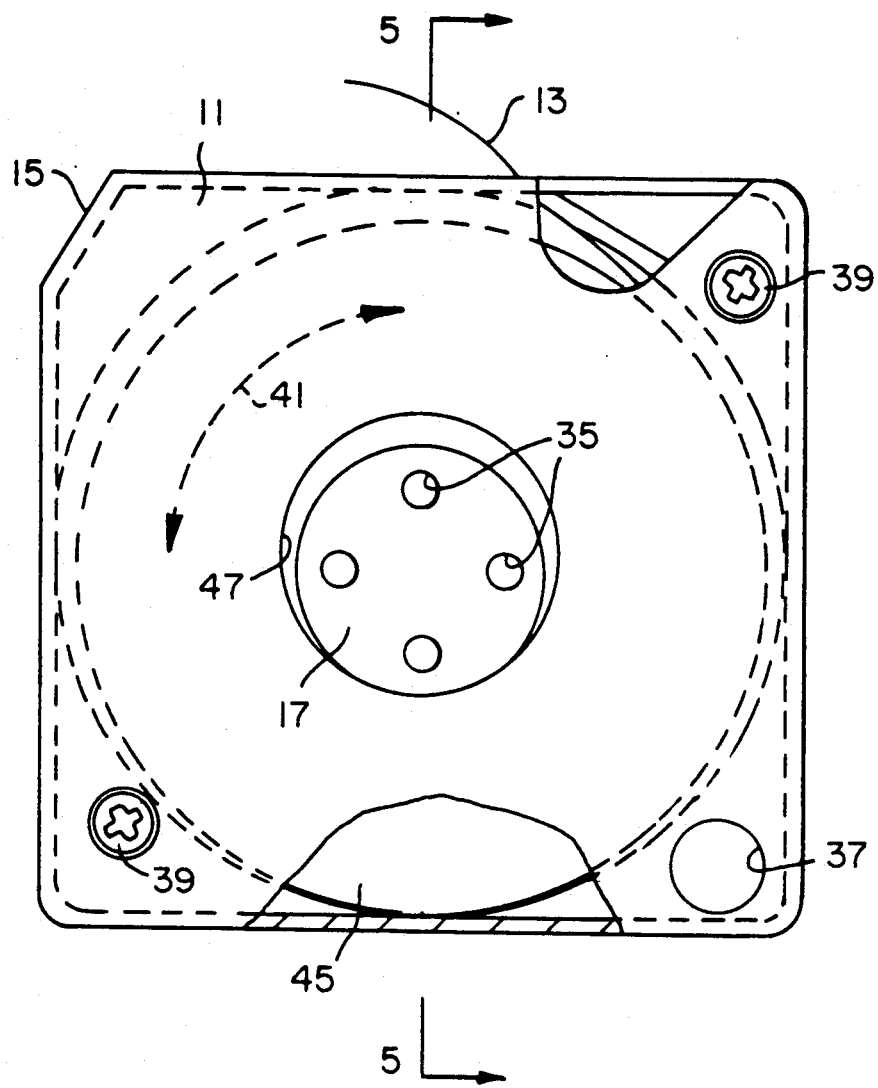
FIG. 2 is a enlarged front elevational view of the conventional film cartridge shown in FIG. 1 having a portion broken away and in section. The entire view illustrating details of construction of a conventional film cartridge.

The cartridge box 11 includes a back-side 31 and end portions 33 which form the cartridge box 11. As shown in FIGS. 2 and 5, the hub 17 includes a plurality of holes 35 which are positioned to engage with the projecting pins 21. Shown in FIG. 2 is a front face view of the cartridge box 11, which has been partially cut away to show the film 13. The film 13 is also shown in dotted lines behind the front wall of the cartridge box 11. Alignment hole 37 is provided to assist in locating the cartridge box 11 when it is inserted in to the motor driven viewing machine. Also shown in FIG. 2 are screws 39 which permit the face of the cartridge box 11 to be removed. While these screws 39 are convenient for removing the hub or otherwise performing maintenance on the cartridge system, it is at least time consuming to remove these screws 39 and the face of the cartridge box 11 every time there is a need to rewind or adjust the film 13 on the reel hub 17. As can be seen from FIG. 2, the hub 17 and the film 13 are not centered about the center of the cartridge box 11, and for that reason, it is difficult to wind or unwind the film in either direction shown by arrow 41.

Figure 3:
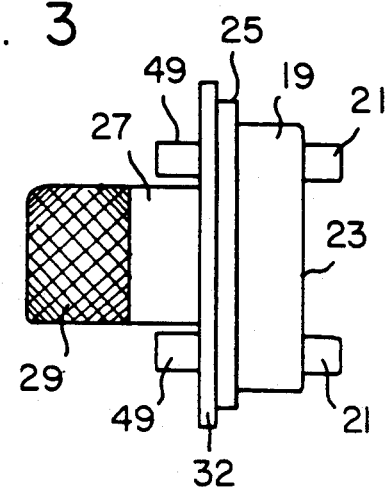
FIG. 3 is an enlarged side elevational view of the manual disengageable, winding a positioning actuator shown in FIG. 1 but showing the actuator slightly modified by the addition of two 180 degree angularly disposed cylindrical protrusions on the front face of the actuator hub.
Figure 4:
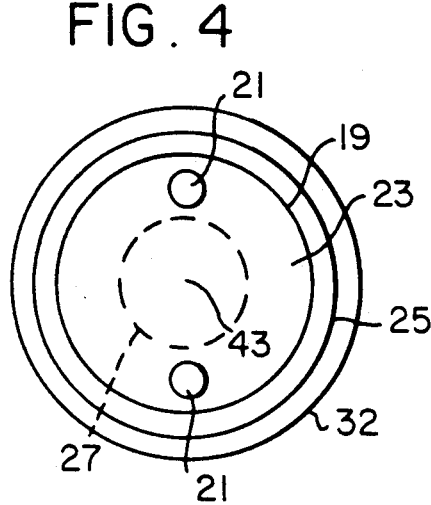
FIG. 4 is an end elevational view of the inner face of the actuator shown in FIG. 3.

When the device of the present invention is used properly, the hub 17 of cartridge box 11 is centered about the axis of the box 11. As shown in FIG. 4, the body 19 is itself centered about an axis 43. In the embodiment illustrated, the pins 21 are diametrically opposed and spaced the same radial distance from the central axis 43. It is noted that other pin configurations are possible so long as the pins fit the openings in the reel hub 17 to provide a doving connection. Annular rim 25 is also centered about axis 43, as is a larger back ring 32. FIG. 3 shows the relative relationships of the body 19, annular rim 25, and back ring 32, all of which are centered about axis 43.

As shown in FIG. 5, the hub 17 includes a reel portion 45 typically molded from plastic which extends near the ends 33 of the cartridge box 11. The front face of the cartridge box 11 includes an annular space 47 which forms an opening for the annular rim 25. The annular rim 25 is centered about the center of the cartridge box 11 and the axis 43 of the spinner body 19 when the projection pins 2 engage holes 35 in hub 17. As long as the annular rim 25 remains in the annular space 47, the reel portion 25 does not contact the end wall 33 and the film can be wound or unwound as desired.

In one embodiment, in order to provide an increase in leverage for turning the handle 27, pins or projections 49 are mounted on the back face of the ring 32 to provide additional torque.

The device of the present invention is admirably suited for a quick and safe adjustment of the film held by a cartridge reel. The film can be taken out by hand or rewound for storage without use of the motorized drive unit. It does not become stuck or bound up, and is therefor protected from unnecessary wear. Film will last much longer, particularly in high volume use facilities.

While particular embodiments of the present invention has been illustrated and described herein, it is not intended to limit the invention and changes and modifications may be made therein within the scope of the following claims.

What is claimed is:

1. A manual spinner tool device (10) for use with a cartridge reel mounted for free floating in a housing (11) having an opening (47), the reel having a reel hub 17 with openings (35), comprising;
    a generally cylindrical spinner body (19) having a front circular face (23) sized to access said reel hub (17) and a circular rear face (32);
    a pair of diametrically spaced projection pins (21) on said face (23) for engagement with the openings (35) in the reel hub (17);
    an annular rim (25) on said body (19) adjacent said rear face (32) and sized to fit the cartridge opening (47) to center said hub in the axial center (43) of the cartridge reel to space said reel from the inside of said cartridge housing, said circular rear face (32) having a larger in diameter than the cartridge opening (47) to limit the axial movement of said rim (25) into cartridge opening (47);
    handle means (27) for gripping said body (19) and rotating said hub (17), said handle means extending from said rear face (32) and having an axially centered cylindrical handle haivng a grip increasing surface (29) on at least a portion thereof; and
    a second pair of pins (49) projecting from said rear face (32) outboard of said centrally located handle (27) providing leverage means for rotating the spinner tool.

* * * * *